(12) United States Patent
Sun et al.

(10) Patent No.: US 11,487,989 B2
(45) Date of Patent: Nov. 1, 2022

(54) DATA REUSE METHOD BASED ON CONVOLUTIONAL NEURAL NETWORK ACCELERATOR

(71) Applicant: Nanjing Iluvatar CoreX Technology Co., Ltd., Nanjing (CN)

(72) Inventors: Yile Sun, Shanghai (CN); Pingping Shao, San Jose, CA (US); Yongliu Wang, Shanghai (CN); Jinshan Zheng, Shanghai (CN); Yunxiao Zou, Shanghai (CN); Haihua Zhai, Shanghai (CN)

(73) Assignee: Shanghai Iluvatar CoreX Semiconductor Co., Ltd., Shanghai (CN)

( * ) Notice: Subject to any disclaimer, the term of this patent is extended or adjusted under 35 U.S.C. 154(b) by 883 days.

(21) Appl. No.: 16/237,613

(22) Filed: Dec. 31, 2018

(65) Prior Publication Data
US 2020/0042860 A1    Feb. 6, 2020

(51) Int. Cl.
*G06N 3/04*     (2006.01)
*G06F 9/54*     (2006.01)
*G06F 17/15*    (2006.01)

(52) U.S. Cl.
CPC .............. *G06N 3/04* (2013.01); *G06F 9/544* (2013.01); *G06F 17/15* (2013.01)

(58) Field of Classification Search
None
See application file for complete search history.

(56) References Cited

U.S. PATENT DOCUMENTS

| | | | |
|---|---|---|---|
| 11,120,330 B2 * | 9/2021 | Park | G06N 3/063 |
| 11,301,728 B2 * | 4/2022 | Croxford | G06V 10/82 |

* cited by examiner

*Primary Examiner* — Craig C Dorais
(74) *Attorney, Agent, or Firm* — Loeb & Loeb LLP

(57) ABSTRACT

A data reuse method based on a convolutional neural network accelerator includes a tile scanning module receiving command information of a command module, the command information comprising a size of a CNN job to be divided into tile blocks; a tile scanning module according to a tile. The size of the tile generates the coordinates of the tile block and sends it to the memory request module; the memory request module generates a memory read request and sends the memory read request to the memory module; the memory module sequentially returns the tile block data to the input activation In the weight buffer unit, the input activation weight buffer unit saves the received tile block data to implement data reuse and transmits the received tile block data to the calculation processing unit PE.

6 Claims, 3 Drawing Sheets

DATA REUSE METHOD BASED ON CONVOLUTIONAL NEURAL NETWORK ACCELERATOR

CROSS-REFERENCE TO RELATED APPLICATION

This US nonprovisional patent application claims priority to a Chinese invention application serial number 201810862232.6, filed on Aug. 1, 2018, whose disclosure is incorporated by reference in its entirety herein.

TECHNICAL FIELD

The embodiments of the invention generally relate to the field of convolutional neural network accelerator technology, and in particular to a data reuse method based on a convolutional neural network (CNN) accelerator.

BACKGROUND

The Convolutional Neural Network (CNN) Accelerator operates on two main inputs, namely "input activation" and "weight." IA data (Input Activation, IA for short) has three dimensions, namely W, H, C. The weight data has 4 dimensions, i.e., R, S, C, K. W, H, C, K can be large values up to 1024 bits. R, S can be small values (up to 5 or 7). Each element is usually 16 bits of data. Also, weighting data requires multiplier and accumulation operations. A typical CNN accelerator has about 1K MAC units. With this computing power, it will take about 50,000 to 3,000,000 cycles to complete the calculation of the CNN layer. The accelerator must be a MAC unit to provide all the input IA and weight required for each cycle. The system's memory bus can provide less bandwidth, so it requires input data to be well reused within the accelerator.

SUMMARY

Aspects of the invention provide technical solutions to the technical problem by providing a data reuse method based on a convolutional neural network (CNN) accelerator for the above-mentioned deficiencies of the prior art, and the data reuse method based on the CNN accelerator may save memory bus bandwidth and power consumption while maximizing data reuse in a limited cache size.

To achieve at least the above technical features, aspects of the invention may include:

A data reuse method based on a CNN accelerator. In one example, the CNN accelerator includes a command module for performing a data reuse method, a tile scanning module, a memory request module, a memory module, an input activation weight buffer unit, and a calculation processing unit PE. The data reuse method may include the following steps:

(1) The tile scanning module receives command information of the command module, where the command information includes a size that needs to divide the CNN job into tile blocks;

(2) The tile scanning module generates coordinates of the tile block according to the size of the tile block, and sends the coordinate information of the tile block to the memory request module;

(3) The memory request module generates a memory read request according to the coordinates of the tile block, and sends the memory read request to the memory module; and (4) The memory module sequentially returns the tile block data to the input activation weight buffer unit, and the input activation weight buffer unit saves the received tile block data to implement data reuse and sends the received tile block data to the calculation processing unit. PE.

As a further improvement of the technical solution of the embodiments of the invention, the size of the tile block may include a width dimension, a height dimension, and a weight dimension.

As another embodiment of the invention, the coordinates of the tile block may include width information, height information, and channel information.

As a further improvement of the technical solution of the embodiment of the invention, the step (2) further may include: the tile scanning module configuring different computing processing units PE for the tile blocks;

The configuration method may include: allocating tile block data corresponding to tile blocks of the same width information, the same height information, and different channel information to the same calculation processing unit PE.

As a further improvement of the technical solution of the embodiment of the invention, the step (3) may further include: the data buffer unit saves the received tile block data, and according to a configuration method of the tile block corresponding to the received tile block data, the received tile block data is sent to the corresponding calculation processing unit PE.

As a further improved technical solution of the embodiments of the invention, the CNN job may include an input activation data.

Aspects of the invention may provide beneficial effects that the embodiments of the invention may maximize the reuse of the data in the input activation weight buffer unit and realize the minimum memory access bandwidth by performing tile block segmentation processing on the data; and maximize the limited cache size data reuse.

DETAIL DESCRIPTION OF DRAWINGS

In order to more clearly describe the technical schemes in the specific embodiments of the present application or in the prior art, hereinafter, the accompanying drawings required to be used in the description of the specific embodiments or the prior art will be briefly introduced. Apparently, the drawings described below show some of the embodiments of present application, and for those skilled in the art, without expenditure of creative labor, other drawings may be derived on the basis of these accompanying drawings.

DETAILED DESCRIPTION

Embodiments of the invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the embodiments of the invention may be embodied as methods, systems, computer readable media, apparatuses, or devices. Accordingly, the embodiments of the invention may take the form of an entirely hardware embodiment, an entirely software embodiment, or an embodiment combining software and hardware aspects. The following detailed description may, therefore, not to be taken in a limiting sense.

The various embodiments of the invention are further described below with reference to FIGS. 1 through 3:

Embodiments of the invention may design a tile scanning module (Tile Scan, TS for short) in a convolutional neural network (CNN) accelerator. The input activation data may be partitioned into tile blocks and sent to a subsequent execution engine PE (i.e., computation processing unit PE). This segmentation occurs in the W, H, C, and K dimensions of the IA and weights. The TS may include multiple scan sequence selections to split the tiles. The tile scheduler may provide a configurable sequence that maximizes the reuse of data in the data cache and achieves minimal memory access bandwidth. The sequence with the best performance and power may vary from layer to layer and depends on the size of the Input Activation (IA) data cache and the W cache.

Figure 1:
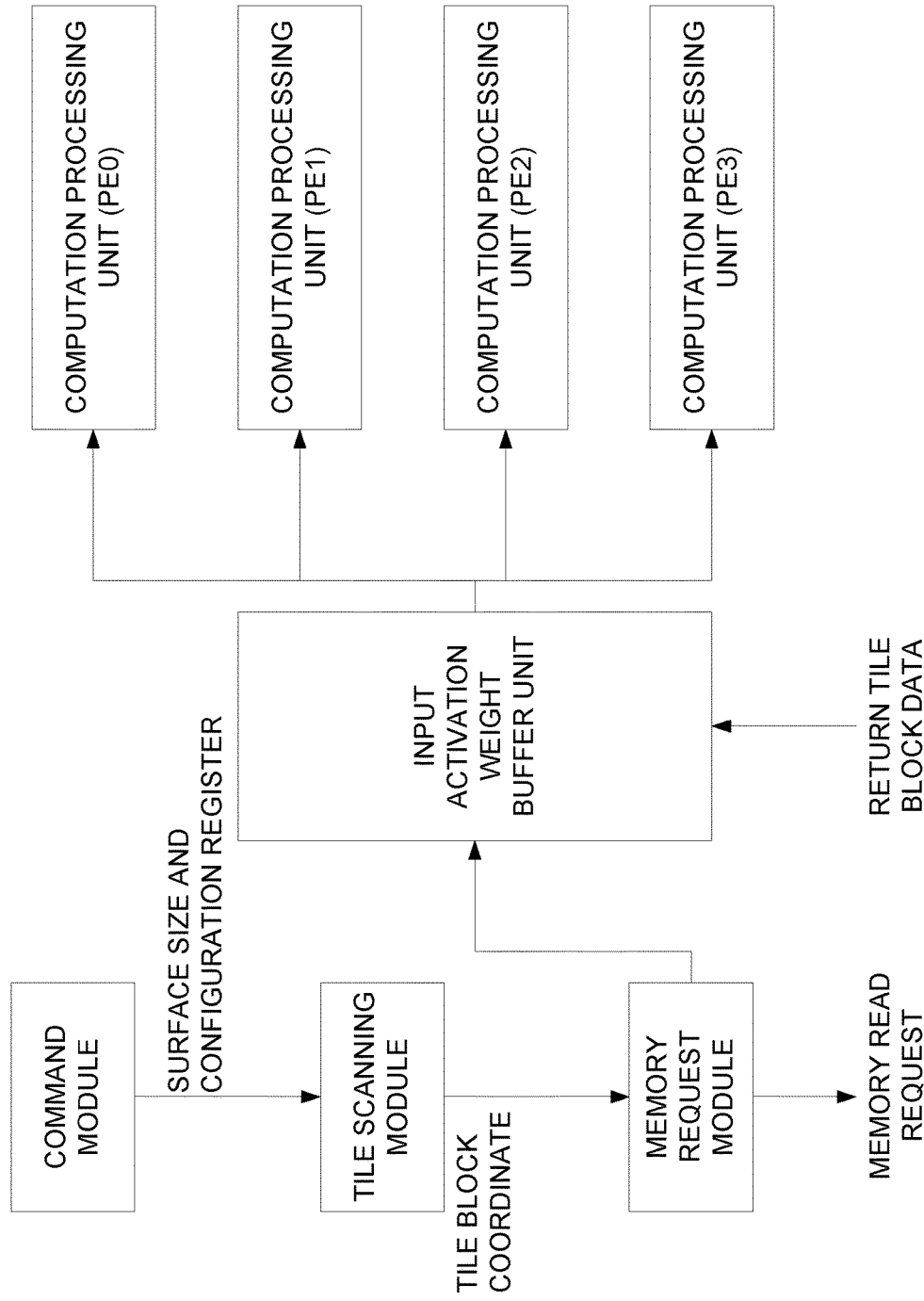
FIG. 1 is a schematic view of the structure according to one embodiment of the invention.

Referring to FIG. 1, a data reuse method based on a convolutional neural network accelerator includes a command module for performing a data reuse method, a tile scanning module, a memory request module, a memory module, an input activation weight buffer unit, and a calculation processing unit PE; The calculation processing unit PE in the embodiment includes four, that is, PE0, PE1, PE2, and PE3.

Includes the following steps:

(1) The tile scanning module receives command information of the command module, where the command information includes a size required to divide the CNN job into tile blocks; specifically, the command information includes surface sizes of IA and W and some configuration register values;

(2) The tile scanning module generates coordinates of the tile block according to the size of the tile block, and sends the coordinate information of the tile block to the memory request module;

(3) The memory request module generates a memory read request according to the coordinates of the tile block, and sends the memory read request to the memory module; and (4) The memory module sequentially returns the tile block data to the input activation weight buffer unit, and the input activation weight buffer unit saves the received tile block data to implement data reuse and sends the received tile block data to the calculation processing unit PE.

The dimensions of the tile block include dimensions in the width dimension, dimensions in the height dimension, and dimensions in the weight dimension.

The coordinates of the tile block include width information, height information, and channel information.

The step (2) further includes: the tile scanning module configuring different computing processing units PE for the tile blocks; and the configuring method comprises: corresponding to the same width information, the same height information, and different tile information of the channel blocks. The tile block data is assigned to the same computation processing unit PE.

The step (3) further includes: the data buffer unit saves the received tile block data, and sends the received tile block data to the tile block according to the configuration method of the tile block corresponding to the received tile block data. Corresponding to the calculation processing unit PE.

The CNN job includes input activation data.

The tile scan block in this embodiment divides the entire CNN job into smaller jobs (i.e., tile blocks) and assigns these jobs to a configurable number of Processing Engines (PEs), also known as computation processing. Unit PE.

The PE job is to calculate the number of active pixels for multiple outputs. The size of the IA data and the weight of the tiles are programmable. Typically, the size of the IA tile block data is 8×8×8 and the weight is R×S×8×16. The IA tile block data size can also be 8×16, 4×16, and the like. The weight size can also be R×S×8×8. The delta C and K values of the tile block may also be less than 8.

Jobs with the same W/H (width information/height information) but different C (channel information) should be assigned to the same PE so that the PE can accumulate the complete OA without generating a partial sum.

Example of tile scan partition sequence in W broadcast mode:

First, four pieces of 8×8×8 (number of elements in the W direction×number of elements in the H direction and number of elements in the C direction) tile block data corresponding to the tile block are allocated to four PEs. They have different W/H coordinates but have the same weight K=0~15. When one of the PEs completes the tile block data, the TS allocates tile block data corresponding to another 8×8×8 tile block having the same W/H and higher channel to it until 8×8×C is completed in the same PE. Then assign another 8×8×8 with the next W/H to the PE.

All PEs handle the same 16 K weight simultaneously. This is called a W value broadcast.

There is another mode, IA broadcast, in which all PEs work under the same IA and different weights. In this case, one PE works on a weight of 16K, and four PEs can simultaneously perform weights K=0 to 63. The choice of IA or W broadcast given a certain cache size may vary depending on the different CNN layers and depends on the IA/W size, the cache size and the consequent overall memory bandwidth.

After completing all the channels of a certain number of tile blocks with weights K=0~15, the TS re-synchronizes the IA data with the next 16 K weight until all the weights become a loop, and then switches to the next set of IA tiles. Piece.

The optimal number of such sets of tile block data should be such that all of the IA data in the K loop can be stored in the IA data cache (input activation weight buffer unit), thereby eliminating the need for IA data reloading.

Figure 2:
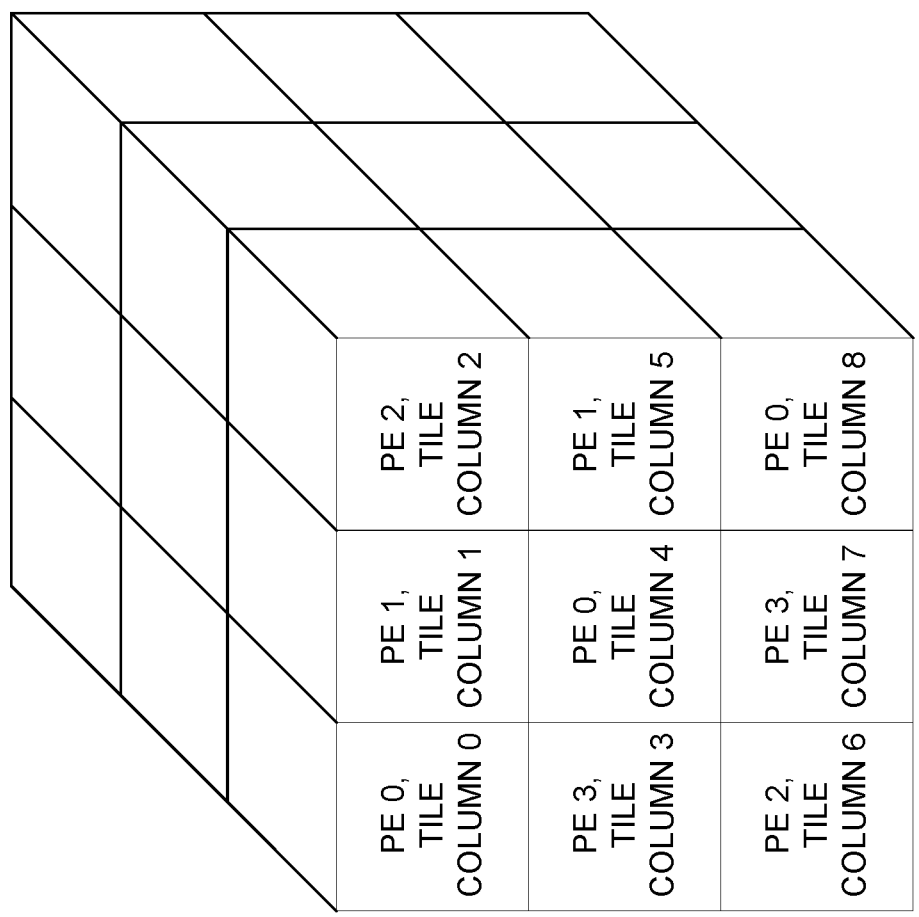
FIG. 2 is an allocation diagram of a computing processing unit PE according to one embodiment of the invention.

As shown in FIG. 2, each tile column in the figure consists of three tile blocks with the same W coordinate (width information) and H coordinate (height information) but different C coordinates (channel information) (in FIG. 2 Block). In this figure, tile columns 0 through 3 are assigned by TS to PE0 to PE3. After the PE completes the calculation, tile columns 4 through 7 are assigned to PE0 through PE3. The last tile column 8 is then assigned to PE0. That is, jobs with the same W/H (width information/height information) but different C (channel information) should be assigned to the same PE.

Figure 3:
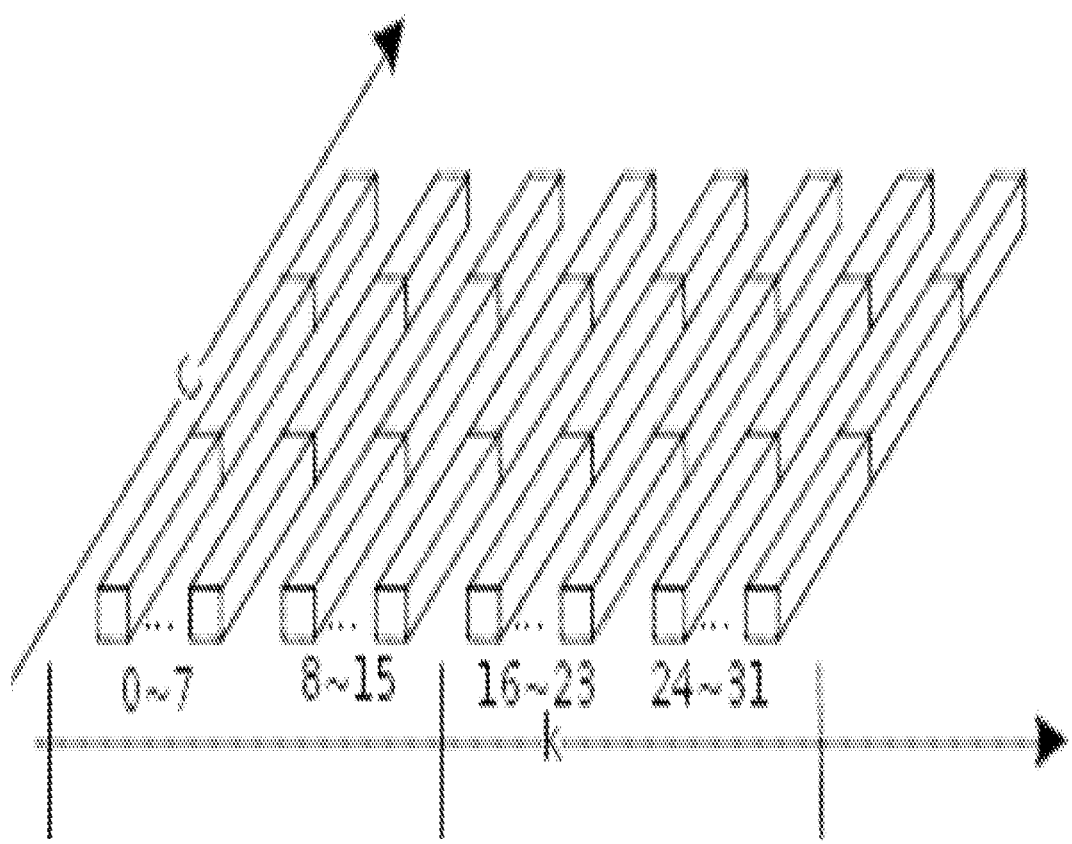
FIG. 3 is a W-value weight map of a tile block according to one embodiment of the invention.

As shown in FIG. 3, each cube in the figure represents the W (weight) of a tile block. The PE can calculate 16 W with the IA of the tile block at a time. In the figure, it is 32 W (K=0~31), which is divided into two groups: K=0~15, K=16~31. In the W broadcast (W value weight) mode, the TS splits the IA tile block with a certain W group in the following order:
(1) Run IA tile blocks 0~11 with W K0~K15;
(2) Run IA tile blocks 0~11 with W K16~K31;
(3) Run IA tile blocks 12~23 with W K0~K15;
(4) Run IA tile blocks 12~23 with W K16~K31.

The weight is rounded up every 4 tiles, and the number of tile columns is programmable.

The embodiments of the invention implement various data segmentation sequences for data reuse and storage bandwidth savings. Different cache sizes and different layers can choose different sequences.

The scope of the embodiments of the invention include, but is not limited to, the above embodiments, and the scope of the embodiments of the invention are defined by the claims, and any substitutions, modifications, and improvements which are obvious to those skilled in the art to which the embodiments of the invention are made fall within the scope of the embodiments of the invention protected range.

Apparently, the aforementioned embodiments are merely examples illustrated for clearly describing the present application, rather than limiting the implementation ways thereof. For a person skilled in the art, various changes and modifications in other different forms may be made on the basis of the aforementioned description. It is unnecessary and impossible to exhaustively list all the implementation ways herein. However, any obvious changes or modifications derived from the aforementioned description are intended to be embraced within the protection scope of the present application.

The example embodiments may also provide at least one technical solution to a technical challenge. The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, may comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

While the disclosure has been described in terms of exemplary embodiments, those skilled in the art will recognize that the disclosure can be practiced with modifications that fall within the spirit and scope of the appended claims. These examples given above are merely illustrative and are not meant to be an exhaustive list of all possible designs, embodiments, applications, or modification of the disclosure.

In summary, the integrated circuit with a plurality of transistors, each of which may have a gate dielectric with properties independent of the gate dielectric for adjacent transistors provides for the ability to fabricate more complex circuits on a semiconductor substrate. The methods of fabricating such an integrated circuit structures further enhance the flexibility of integrated circuit design. Although the invention has been shown and described with respect to certain preferred embodiments, it is obvious that equivalents and modifications will occur to others skilled in the art upon the reading and understanding of the specification. The embodiments of the invention include all such equivalents and modifications, and is limited only by the scope of the following claims.

What is claimed is:

1. A data reuse method based on a convolutional neural network (CNN) accelerator, comprising: a command module for performing a data reuse method, a tile scanning module, a memory request module, a memory module, an input activation weight buffer unit, and a calculation processing unit (PE);

Includes the following steps:
  (1) The tile scanning module receives command information of the command module, where the command information includes a size that needs to divide the CNN job into tile blocks;
  (2) The tile scanning module generates coordinates of a tile block according to a size of the tile block, and sends the coordinate information of the tile block to the memory request module;
  (3) The memory request module generates a memory read request according to the coordinates of the tile block, and sends the memory read request to the memory module;
  (4) The memory module sequentially returns the tile block data to the input activation weight buffer unit, and the input activation weight buffer unit saves the received tile block data to implement data reuse and sends the received tile block data to the calculation processing unit PE.

2. The data reusing method based on the convolutional neural network accelerator according to claim 1, wherein the size of the tile block comprises a dimension in a width dimension, a dimension in a height dimension, and a dimension in a weight dimension.

3. The data reusing method based on the convolutional neural network accelerator according to claim 2, wherein the coordinates of the tile block comprise width information, height information, and channel information.

4. The data reusing method based on the convolutional neural network accelerator according to claim 3, wherein the step (2) further comprises: the tile scanning module configuring different computing processing units PE for the tile blocks;

The configuration method includes: allocating tile block data corresponding to tile blocks of the same width information, the same height information, and different channel information to the same calculation processing unit PE.

5. The data reusing method based on the convolutional neural network accelerator according to claim 4, wherein the step (5) further comprises: the data buffer unit saves the received tile block data, and receives and receives according to the configuration method of the tile block corresponding to the tile block data to be sent transmits the received tile block data to the corresponding calculation processing unit PE.

6. The method of data reuse based on the convolutional neural network accelerator according to claim 1, wherein said CNN job comprises input activation data.

* * * * *